United States Patent Office 3,384,668
Patented May 21, 1968

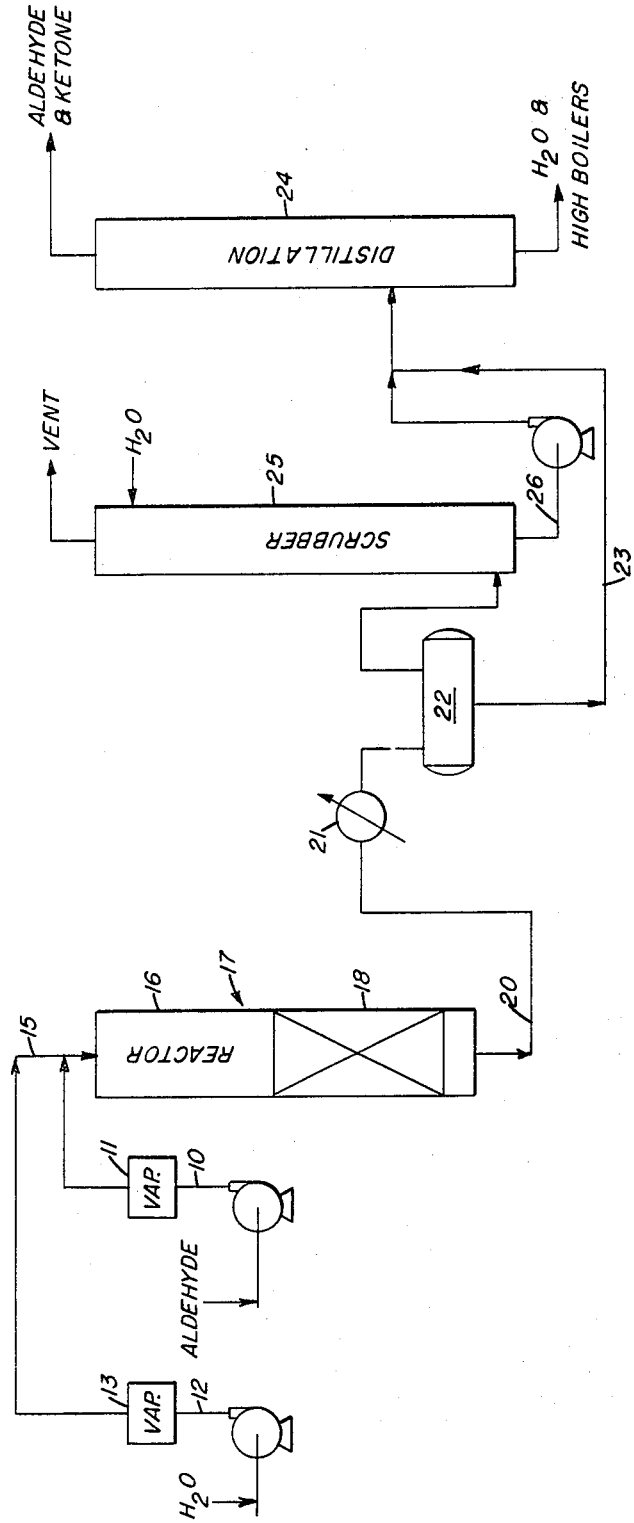

3,384,668
CONVERSION OF ALDEHYDES TO KETONES
Frank C. Canter and Milton A. Perry, Longview, Tex., assignors to Eastman Kodak Company, Rochester, N.Y., a corporation of New Jersey
Filed Nov. 12, 1964, Ser. No. 410,569
6 Claims. (Cl. 260—593)

ABSTRACT OF THE DISCLOSURE

Isomerization of aliphatic aldehydes to ketones by contact in the vapor state with a solid acidic catalyst, e.g. phosphoric acid on a support, at a temperature above 100° C.

---

This invention relates to the isomerization of aldehydes to ketones and more particularly to a novel method for converting alkyl-substituted acetaldehydes to isomeric ketones.

Although not a well-known reaction, the chemical literature discloses a few instances of the catalytic conversion of aldehydes to isomeric ketones: Iskimura, Bull. Chem. Soc. Japan, 16, 196 (1941); C.A., 36, 4487; Danilov, Zhur. Obshchei Khim. (J. Gen. Chem.), 18, 2000–7 (1948); C.A. 43, 4632f; and Ramart-Lucas et al., Bull soc. chim., 45, 478, 718 (1929) and 49, 1860 (1931). These have generally been liquid phase reactions or have employed aryl-substituted acetaldehydes. The conversions to ketones have been low, e.g., of the order of 2 to 5 percent.

Our novel process, in general, comprises contacting an aldehyde of the formula,

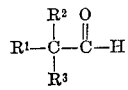

wherein $R^1$, $R^2$ are lower alkyl groups and $R^3$ is hydrogen or lower alkyl, in the vapor phase with a molar excess of water of at least about 5:1 and a solid acidic catalyst such as supported phosphoric acid or an acidic, silica-containing catalyst of the type employed in the catalytic cracking of hydrocarbons, at a temperature of 200–600° C.

Thus, whereas aryl-substituted acetaldehydes have been isomerized to ketones only with poor conversions of the desired products, we have discovered unexpectedly that di- and trialkyl-substituted acetaldehydes, and especially isobutyraldehyde, can be converted to the isomeric ketones with unexpectedly good conversions and yields when the aldehyde is contacted in the vapor phase at elevated temperature with a solid acidic catalyst in the presence of a high concentration of water as a diluent, silica-containing composites of the type used for catalytic cracking of petroleum gas oils being the type of catalyst that produces the most outstanding results.

The process will be described in more detail by reference to the drawing of which the sole figure is a schematic flow diagram of one embodiment of the process.

Referring to the drawing, the aldehyde feed is introduced via line 10 to a feed preheater 11 in which the feed is vaporized and heated to reaction temperature of 200 to 600° C. Water in a large molar excess with respect to the aldehyde feed is introduced via line 12 to preheater 13 where it also is vaporized and heated to reaction temperature, although steam at reaction temperature from any other source can be used as well.

The preheated streams of aldehyde vapor and steam are introduced via line 15 into the upper end of the elongated tubular reaction vessel 17 and pass downwardly through a mixing and preheating zone in the upper portion 16 of the vessel, advantageously filled with inert ceramic packing, and then through a bed of solid catalyst 18 in the lower portion of the vessel. Reactor effluent is continuously withdrawn via line 20. The normally liquid components are condensed by indirect heat exchange in the water-cooled condenser 21 and collected in drum 22. The liquid product is passed via line 23 to conventional product recovery means for separation of the ketone product from water, unconverted feed, and by-products, e.g., by distillation in column 24. Uncondensed vapor from drum 22 is water-scrubbed in scrubber 25 to recover entrained ketone, which is withdrawn with the scrubbing liquid via line 26 and is subsequently separated, for example, with the main product stream.

Although the drawing illustrates the use of a fixed bed catalyst in carrying out our process, other procedures for contacting the vaporized feed with the solid catalyst can be employed. Especially good results are obtained with fluid bed catalysts. In an operation of this type the vaporized feed in admixture with steam is passed upwardly through a bed of powdered catalyst at a flow rate sufficient to maintain the catalyst as a turbulent suspended bed, in accordance with the well-known fluidized-bed technique.

We have found that isobutyraldehyde is particularly adapted for conversion to its isomeric ketone, methyl ethyl ketone, in high conversion and yield by the procedure of our invention. We do not wish to be bound by theoretical explanations but it appears that the steric and electrical factors peculiar to the structure of isobutyraldehyde, with its single α-hydrogen atom and two methyl groups atached to the α-carbon atom, make it uniquely adapted for acid catalyzed rearrangement by the carbonium ion mechanisms that have been proposed.

While isobutyraldehyde is distinctly superior, even with the less desirable catalysts, our invention extends to the use of the other di- and trialkyl-substituted acetaldehydes as starting materials, especially when employing silica-alumina hydrocarbon cracking catalysts. Suitable aldehyde feeds include, in addition to isobutyraldehyde, 2-methylbutyraldehyde, 2-methylpentaldehyde, 2-ethylhexaldehyde, 2,2-dimethylpropionaldehyde, and the like. With aldehydes in which the groups $R^1$, $R^2$ and $R^3$ are each different radicals the product will comprise a mixture of isomeric ketones, according to the equation:

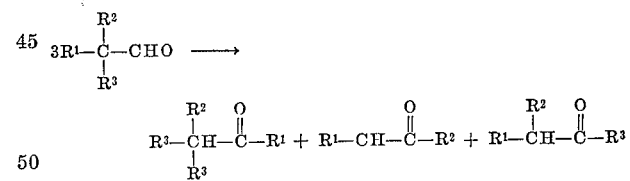

The aldehyde feed can be fed in form of the monomeric aldehyde or in a polymeric form, e.g., isobutyraldehyde trimer or isobutyraldehyde aldoxane. Exceptional purity of feed is not necessary although the usual poisons for acidic catalysts, e.g., basic substances, should not be present in the feed to any substantial extent.

The catalysts for our process are either supported phosphoric acid catalysts or acidic silica-containing catalysts of the type employed for catalytic cracking of hydrocarbons. The phosphoric acid catalysts are suitably prepared by soaking an inert support such as ceramic Berl saddles or pellets or granules of diatomaceous earth, pumice, silica gel or the like with an aqueous solution of phosphoric acid, preferably a concentrated solution of 60–85% phosphoric acid content.

The acidic hydrocarbon cracking catalysts include various composites of silica with acidic metal oxides, comprising a minor amount of the acidic metal oxide, e.g., 5 to 40 weight percent, and the rest essentially silica. Such catalysts include the various coprecipitated composites such as silica-alumina, silica-zirconia, silica-titania, silica-magnesia, silica-boria, and the like. Best results are obtained with silica-alumina composites containing, e.g., 8 to 30 weight percent alumina and the rest essentially silica. Especially good results are obtained with the so-called "high alumina" silica-alumina cracking catalysts containing about 20 to 30 weight percent alumina and the rest essentially silica.

Compositions and physical properties of several silica-alumina catalysts typical of those useful in our process are given in the following table.

TABLE I

| Catalyst [1] | Chemical composition, percent | | | | | Surface area, $m.^2/g.$ | Pore diameter, A. | Pore volume, cc./g. | Bulk density, g./cc. |
|---|---|---|---|---|---|---|---|---|---|
| | $SiO_2$ | $Al_2O_3$ | $Fe_2O_3$ | $Na_2O$ | $SO_4$ | | | | |
| Nalcat | 76 | 23.6 | .05 | .042 | .2 | 285 | 136 | .97 | .4 |
| S-90 | 87.3 | 12.4 | | | | 450 | 70 | .65 | .53 |
| S-46 | 87.3 | 12.4 | | | | 315 | 82 | .57 | .62 |
| Durabead 1 | 90 | 9.7 | | 0.1 | 0.1 | 195 | 72 | .35 | .74 |
| Grade 980 | 87 | 13 | .05 | .02 | | 500 | 60 | .75 | .63 |

[1] The catalysts are designated by their tradenames and are products of the following companies: Nalcat—Nalco Chemical Co.; S-90 and S-46—Houdry Process & Chemical Co.; Durabead 1—Mobil Oil Co.; Grade 980—W. R. Grace & Co. (Davison Chem. Div.).

The phosphoric acid catalysts are employed in a fixed-bed but the acidic cracking catalysts can be employed in fixed or fluidized beds. In fixed beds they are normally employed as pellets or granules and in fluidized beds they are employed as finely divided particles or powder, e.g., of 200 to 350 mesh. The surface area of the catalysts can vary considerably, e.g., from 25 to 800 square meters per gram. Best results are obtained with the silica-containing catalysts having a surface area in the range of about 190 to 500 square meters per gram.

At least some degree of conversion of the aldehyde feed to the isomeric ketone in accordance with the invention is obtained over a considerable temperature range, e.g., of 200 to 600° C. However, the degree of conversion and the yield level adapted for commercial production are obtained in the temperature range of about 375 to 500° C. The process is normally carried out at atmospheric pressure although, if desired, higher or lower pressures can be employed. Superatmospheric pressure can be advantageous in prolonging the catalyst life of the phosphoric acid type of catalyst.

An important factor in our process, as indicated by the working examples hereinafter, is the mixing of water with the aldehyde feed. We have found that at least 5 moles of water per mole of aldehyde must be used in order to achieve a good level of conversion. Best results are obtained when the molar ratio of water to aldehyde is in the range of 10 to 25:1, although ratios of 40:1 or higher can be used.

The feed rate of the water-aldehyde mixture is adjusted to give a residence or catalyst contact time that will provide a sufficiently high level of conversion without causing excessive decomposition of the feed, i.e., low yield, and that will provide a satisfactory space-time yield of ketone. For most of the catalysts employed in our process, a contact time of about 0.1 to 10 seconds is satisfactory, with contact times in the range of 0.5 to 3 seconds producing the best results.

When the catalyst activity declines, the catalyst is regenerated in conventional manner by contact with an oxygen-containing gas and an inert diluent such as steam at a temperature high enough to burn off the carbonaceous deposits. The fixed-bed type of catalyst is regenerated intermittently but the fluidized catalyst can be continuously regenerated by circulating a stream of catalyst between the reaction vessel and a regenerating vessel. The supported phosphoric acid catalysts are difficult to regenerate and normally will be employed for a single reaction cycle. The fact that they can be easily regenerated constitutes one of the advantages of the silica-alumina type catalysts over the supported phosphoric acid catalyst.

The examples which follow further illustrate the principles of our invention.

Example 1

A series of runs was carried out involving the vapor phase contact of isobutyraldehyde with a fixed bed silica-alumina catalyst. The runs were carried out in apparatus of the type illustrated in the drawing. Water and isobutyraldehyde were fed through separate pumps and were vaporized in a coiled stainless steel vaporizer. The vapors were passed downwardly through the tubular reactor having in its upper portion a preheating-mixing section packed with ¼" ceramic Berl saddles and in its lower portion a fixed bed of pelleted silica-alumina catalyst of the type indicated as S-90 in Table I, the catalyst being in the form of 4 mm. x 4 mm. pellets. The catalyst bed was maintained at the desired reaction temperature. A condenser, water-scrubber and distillation column were used to collect the product, the distillation column being operated at 80° C. overhead temperature. The conditions and results of this series of runs are given in Table II below.

TABLE II

| Run No. | Temp., ° C. | Contact time, seconds | Molar ratio $H_2O$/IHBu [1] | Length of run, hrs. | Conversion, percent | Yield, percent |
|---|---|---|---|---|---|---|
| 1 | 410 | 0.5 | 20/1 | 5 | 34.3 | 56.0 |
| 2 | 415 | 0.5 | 20/1 | 5 | 25.3 | 56.5 |
| 3 | 455 | 0.5 | 20/1 | 5 | 43.3 | 61.5 |
| 4 | 460 | 0.5 | 20/1 | 5 | 48.0 | 57.7 |
| 5 | 460 | 0.5 | 20/1 | 12 | 37.4 | 65.0 |
| 6 | 470 | 0.5 | 20/1 | 5 | 42.3 | 59.0 |
| 7 | 500 | 0.5 | 20/1 | 5 | 43.5 | 54.0 |
| 8 | 500 | 0.2 | 20/1 | 5 | 19.2 | 45.0 |
| 9 | 470 | 0.5 | 20/1 | 5 | 42.3 | 59.0 |
| 10 | 450 | 1.0 | 10/1 | 5 | 32.0 | 58.0 |
| 11 | 400 | 2.0 | 10/1 | 5 | 17.6 | 35.0 |
| 12 | 450 | 3.0 | 10/1 | 5 | 38.2 | 42.0 |
| 13 | 500 | 0.7 | 0 | 5 | 3.5 | 25.0 |
| 14 | 500 | 0.7 | 4/1 | 5 | 4.2 | 13.8 |
| 15 | 450 | 1.0 | 10/1 | 5 | 32.0 | 58.0 |
| 16 | 455 | 0.5 | 20/1 | 5 | 43.3 | 61.5 |
| 17 | 470 | 0.5 | 40/1 | 5 | 26.4 | 43.0 |

[1] IHBu=isobutyraldehyde.

The above example shows the critical importance of water as a component of the feed stream. In Runs 13 and 14 in which the feed contained no water or too little water the degree of conversion was drastically reduced.

Example 2

Another series of runs was carried out substantially as in Example 1 but employing as the fixed bed catalyst, a high-alumina silica-alumina catalyst of the type indicated as Nalcat in Table I. The conditions and results of these runs are given in Table III below.

We have tried, as catalysts, various solid acidic substances other than supported phosphoric acid and the

TABLE III

| Run No. | Temp., °C. | Contact, seconds | Molar ratio H₂O/IHBu | Conversion, percent | Yield, percent | Yield to off-gas, percent |
|---|---|---|---|---|---|---|
| 18 | 400 | 0.5 | 20/1 | 41.0 | 68.0 | 11.0 |
| 19 | 400 | 0.6 | 20/1 | 43.5 | 59.0 | 12.4 |
| 20 | 400 | 1.24 | 20/1 | 49.6 | 62.3 | 10.3 |
| 21 | 400 | 2.5 | 20/1 | 44.0 | 54.5 | 13.8 |
| 22 | 375 | 2.5 | 20/1 | 32.0 | 48.0 | 17.5 |
| 23 | 400 | 2.5 | 20/1 | 44.0 | 54.5 | 13.8 |
| 24 | 430 | 2.5 | 20/1 | 49.5 | 58.0 | 16.3 |
| 25 | 460 | 2.5 | 20/1 | 48 | 49.5 | 28.0 |
| 26 | 450 | 0.3 | 5/1 | 14.7 | 48.0 | 14.2 |
| 27 | 450 | 0.3 | 10/1 | 18.2 | 52.0 | 13.5 |
| 28 | 450 | 0.3 | 20/1 | 27.0 | 53.0 | 10.5 |

The above results show that the high-alumina silica-alumina catalyst produces exceptionally good results, with conversions above 40 percent and yields above 60 percent being obtained under the best conditions.

We have obtained similar good results in the isomerization of isobutyraldehyde to methyl ethyl ketone with the other silica-alumina catalysts listed in Table I. In addition we have employed the Nalcat type catalyst of Table I in powdered form in a fluidized bed reactor, as described in the next example.

Example 3

The vaporized feed mixture of water and isobutyraldehyde, preheated to reaction temperature, was passed upwardly into a fluidized bed of Nalcat silica-alumina catalyst of 200 to 350 mesh particle size, at a velocity sufficient to maintain the catalyst in a turbulent suspended state. Conditions and results of three runs are given in the following table.

TABLE IV

| | Run No. | | |
|---|---|---|---|
| | 29 | 30 | 31 |
| Residence time, secs | 4 | 4 | 2.8 |
| H₂O/IHBu, mol. ratio | 10/1 | 10/1 | 10/1 |
| Temp., °C | 420 | 430 | 430 |
| Conversion, percent | 21 | 13 | 15.5 |
| Yield, percent | 40.7 | 56 | 40.4 |

Although the above results show that the fixed-bed catalyst gave higher yields and conversions than the fluid-bed catalyst, this will not necessarily be true of all fluid-bed reactions in accordance with the invention. With improved catalyst circulation procedure in the fluid-bed system substantially better results can be obtained. In any event, an important advantage of the fluid-bed catalyst was found to be that the catalyst stayed active for a longer time and required less time for regeneration than the fixed-bed catalyst.

The use of a phosphoric acid catalyst is illustrated by the following example.

Example 4

In preparing the catalyst, ¼″ ceramic Berl saddles are soaked in 85 percent phosphoric acid and drained. The catalyst is placed in a reactor tube heated at 300–350° C., and isobutyraldehyde is passed through with an equimolar amount of steam. Sufficient phosphoric acid is added to replace any which is lost into the product vapors. At a contact time of 10 seconds, 8.2 percent of the isobutyraldehyde fed is converted per pass into methyl ethyl ketone. Satisfactory results have also been obtained with phosphoric acid on diatomaceous earth (Celatom) at various temperatures, contact times, pressures and water to isobutyraldehyde ratios.

synthetic silica-containing cracking catalyst composites and various acidic liquids with unsatisfactory results.

Although the invention has been described in considerable detail with particular reference to certain preferred embodiments thereof, it will be understood that variations and modifications can be effected within the spirit and scope of the invention as described hereinabove, and as defined in the appended claims.

We claim:
1. The method of converting to an isomeric ketone an aldehyde of the formula,

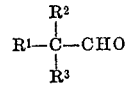

wherein $R^1$ and $R^2$ are lower alkyl and $R^3$ is selected from the group consisting of hydrogen and lower alkyl, which comprises contacting in the vapor phase said aldehyde in admixture with water in a molar ratio of at least 5 mols of water per mol of aldehyde with a catalyst selected from the group consisting of phosphoric acid on a solid support and a composite of silica containing 5 to 40 weight percent based on the total composite of an acidic metal oxide having a surface area in the range of about 25 to about 800 square meters per gram, at a temperature of 200 to 600° C.

2. The method of preparing methyl ethyl ketone which comprises contacting a vapor mixture of isobutyraldehyde and water in a mol ratio of at least 10 mols of water per mol of aldehyde with a catalyst selected from the group consisting of phosphoric acid on a solid support and a composite of silica containing 5 to 40 weight percent based on the total composite of an acidic metal oxide having a surface area in the range of about 25 to about 800 square meters per gram, at a temperature of 200 to 600° C.

3. The method of preparing methyl ethyl ketone which comprises contacting in the vapor phase a mixture of isobutyraldehyde and water in a molar ratio of 10 to 25 mols of water per mol of aldehyde with a silica-alumina catalyst having a surface area in the range of about 25 to about 800 square meters per gram, at a temperature of 375 to 500° C.

4. The method according to claim 3 in which said catalyst is maintained in a fluidized bed.

5. The method of preparing methyl ethyl ketone which comprises contacting in the vapor phase a mixture of isobutyraldehyde and water in a molar ratio of about 20 mols of water per mol of aldehyde with a silica-alumina catalyst having a surface area in the range of about 25 to about 800 square meters per gram containing about 24 weight percent alumina and the rest essentially silica at a temperature of 375 to 500° C. and a contact time of about 0.5 to 3 seconds.

6. The method of preparing methyl ethyl ketone which comprises contacting in the vapor phase a mixture of isobutyraldehyde and water in a molar ratio of 10 to 25 mols of water per mol of aldehyde with a silica-alumina catalyst having a surface area in the range of about 25 to about 800 square meters per gram containing about 20 to 30 weight percent alumina at a temperature of 375 to 500° C.

References Cited

Weissberger: "Techniques of Org. Chem." vol. II pp. 222 to 223 (1956).

BERNARD HELFIN, *Acting Primary Examiner.*

LEON ZITVER, *Examiner.*

M. JACOB, *Assistant Examiner.*